United States Patent [19]
Clark et al.

[11] Patent Number: 5,397,653
[45] Date of Patent: Mar. 14, 1995

[54] FILLER WIRE COMPOSITION AND METHOD OF WELDING TURBINE COMPONENT WITH FILTER WIRE COMPOSITION AND ITS PRODUCT THEREOF

[75] Inventors: Robert E. Clark, Orlando, Fla.; Dennis R. Amos, Rock Hill, S.C.; Timothy L. Driver, Sandy Ridge Township, Union County, N.C.

[73] Assignee: Westinghouse Electric Corporation, Pittsburgh, Pa.

[21] Appl. No.: 54,170

[22] Filed: Apr. 30, 1993

[51] Int. Cl.⁶ .............................................. C22C 38/58
[52] U.S. Cl. ................................... 428/683; 420/109; 148/529; 148/335
[58] Field of Search ................ 420/109, 683; 148/335, 148/529; 219/146.23

[56] References Cited

U.S. PATENT DOCUMENTS 3,368,887 2/1968 Enis et al. ............................ 420/109
3,602,689 8/1971 Heuschkel ............................ 219/137

OTHER PUBLICATIONS

Development of Filler Metal for Repair Welding of Gas Turbine Components, US Welding Corporation.
Specification for Low Alloy Steel Filler Metals for Gas Shielded Arc Welding, American Welding Society, Jan. 15, 1979 by AWS Committee on Filler Metal.
The Failure Analysis and Repair of a 75 MW Gas Turbine Generator Used in Peaking Service, by R. B. Clark, D. S. Harding and G. M. Tanner.
Material Specification Wire, Steel Welding, US Welding Corporation, Jul. 3, 1990.

*Primary Examiner*—Deborah Yee

[57] ABSTRACT

A filler wire weld composition is set forth which provides high yield strength characteristics comparable to a base substrate made from a high performance Ni—Cr steel alloy. The filler wire weld composition is useful for repair welding substrate alloys used commercially in contexts such as turbine components such as rotors and discs.

20 Claims, 2 Drawing Sheets

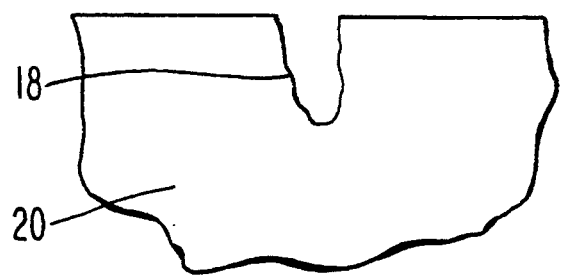
_Fig. 2_
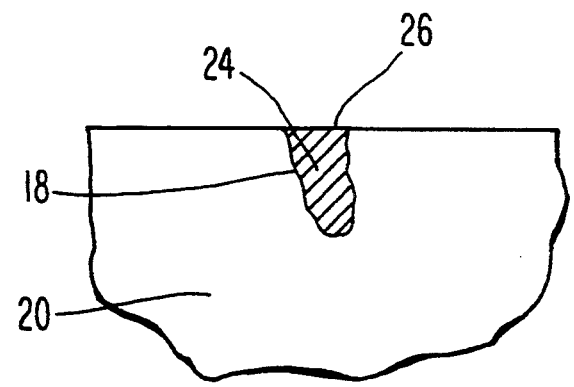
_Fig. 3_ ical composition of a normal combustion turbine disc contains carbon in an amount up to about 0.5% wt., preferably from about 0.1 to about 0.4% wt.; manganese in an amount of from about 0.2-2% wt., preferably from about 0.2-1% wt.; phos-

FILLER WIRE COMPOSITION AND METHOD OF WELDING TURBINE COMPONENT WITH FILTER WIRE COMPOSITION AND ITS PRODUCT THEREOF

FIELD OF THE INVENTION

The present invention relates to welding filler wire compositions. More specifically the present invention relates to welding filler wire compositions which, in welded form, provide for a weld having a high yield strength.

BACKGROUND OF THE INVENTION

Advanced high performance alloy materials are used in a variety of applications such as turbine components. The alloy materials are frequently made from Ni—Cr alloys, including alloys containing molybdenum and vanadium. These alloys find uses as turbine rotors and discs in both gas turbines and steam turbines. The turbine components are characterized by having a high yield strength to withstand the rigorous conditions during use. For instance, conventional base alloy materials used in steam and combustion turbine components have 0.2% yield strengths of from about 135 to about 155 ksi.

Imperfections sometimes result in the manufacture of the turbine components or result in the use of these components under operating conditions. The components must usually be replaced due to the unavailability of an adequate filler weld wire material that can provide a weld deposit having a comparable yield strength to that of the base metal.

Filler weld wire composition standards have been set by various testing societies. The American Welding Society has set forth various compositions in AWS A5.28 classes ER80, 90, 100, 110, and 120 that have 0.2% yield strengths of up to about 120 ksi. Commercially available filler weld wire compositions, such as those available from United States Welding Corporation contain from 0.09-0.11% wt. C, 1.8-2.0% wt. Mn, 0.3-0.4% wt Si, 0.002-0.005% wt. S, 0.9-1.05% wt. Cr, 2.2-2.4% wt. Ni, 0.55-0.7% wt. Mo, less than 0.005% wt. P, less than 0.01% wt. vanadium, and residual levels of other elements. However, the highest attainable 0.2% yield strengths with this material is up to 135 ksi.

There exists a need to develop a filler weld wire composition which has the strength characteristics comparable to the high performance base alloy materials. The filler wire composition should thus be able to provide a weld that has a comparable 0.2% yield strength to the base alloy while not compromising other physical characteristics below acceptable levels.

SUMMARY OF THE INVENTION

The present invention provides a filler wire composition useful for providing a high strength repair weld to the surface of a nickel-chromium (Ni—Cr) alloy material. The filler wire is preferably used to weld turbine rotors and discs. The filler wire, after being subjected to a postweld heat treatment process, provides a weld that meets a minimum 0.2% yield strength of at least 140 ksi required for high performance combustion and steam rotors and discs made preferably from Ni—Cr—Mo alloys. The present invention also provides for methods of welding the filler wire to the alloy surface and the resultant welded alloy material.

The filler wire composition of the present invention contains from about 0.10-0.12 weight percent carbon, from about 1.65-1.85 weight percent manganese, from about 1.90-2.10 weight percent nickel, from about 0.50-0.60 weight percent chromium, from about 0.48-0.63 weight percent molybdenum, and from about 0.008-0.020 weight percent vanadium. The remainder of the filler wire is preferably an iron alloy, more preferably a high purity iron alloy such that the balance of the filler wire composition is iron. Generally at least about 90, preferably at least about 94, weight percent of the filler wire is iron.

The filler wire is applied to the alloy surface to be repaired by conventional means. A preferred welding procedure is a gas tungsten arc welding procedure. Following the welding procedure, the weld area is subjected to a postweld heat treatment. This heat treatment is generally conducted by heating the weld to a temperature of from about 510° C. (950° F.)-620° C. (1150° F.) for about 5-20 hours at temperature.

BRIEF DESCRIPTION OF THE DRAWINGS

FIG. 2 is a cross sectional view of a substrate alloy material containing a crack or surface imperfection.

FIG. 3 is a cross sectional view of a substrate alloy material containing a weld.

DETAILED DESCRIPTION OF THE INVENTION

Figure 1:
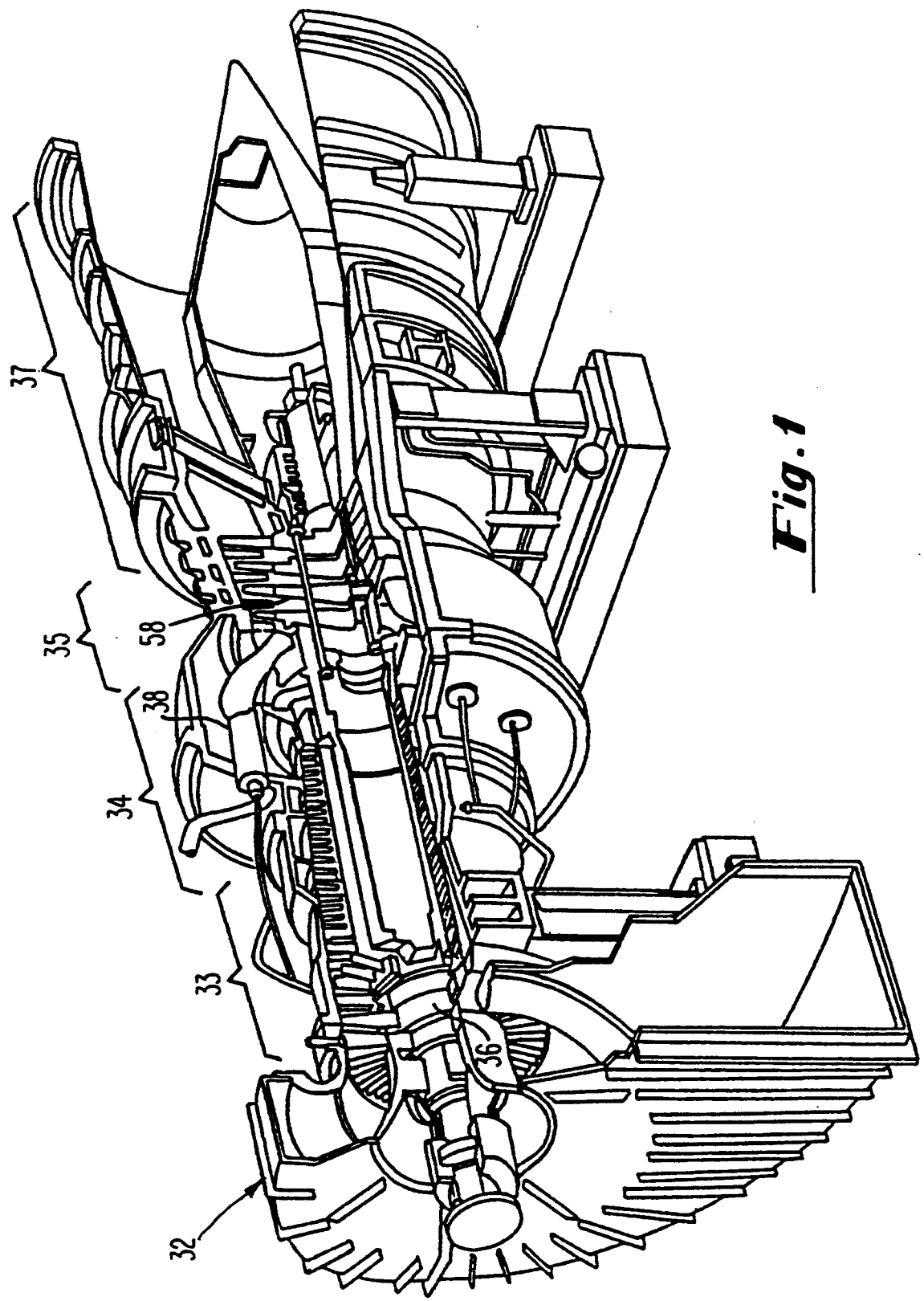
FIG. 1 is an isometric view, partially cut away, of a gas turbine.

The present invention sets forth a filler wire composition useful for welding high performance alloy substrates made from alloys such as Ni—Cr alloys, Ni—Cr—Mo alloys, and Ni—Cr—Mo—V alloys. These alloy substrates are manufactured into various materials such as combustion turbine components including turbine rotors and discs or wheels. The filler wire composition, upon being subjected to a postweld heat treatment, provides a weld having a superior 0.2% yield strength (ASTM-A370).

The 0.2% yield strength of the filler weld wire compositions of the present invention, after applying the filler wire composition to form a weld deposit and subjecting the deposit to the heat treatment described herein, is at least 140 ksi, preferably at least about 145 ksi, and more preferably at least about 150 ksi. The maximum 0.2% yield strength is about 155 ksi. This high yield strength is therefore comparable to that of the substrate component made with the base alloy substrate. The filler weld wire composition, when applied as a weld deposit and following a heat treatment, has an impact strength of at least 25 ft-lb. at about 22° C. (70° F.), and a FATT$_{50}$ value of below 10° C. (50° F.).

The development of a filler wire requires that the final product have the desired yield strength and also impact strength. In practice it has been found that these two properties are inversely related and thus it is important to select a filler wire composition that will have the proper chemical blend to meet both of these property requirements. The filler wire composition must also be a low-alloy iron-based composition such that it has a thermal coefficient of expansion similar to the component upon which it is to be used.

An example of the chemical composition of a normal combustion turbine disc contains carbon in an amount up to about 0.5% wt., preferably from about 0.1 to about 0.4% wt.; manganese in an amount of from about 0.2-2% wt., preferably from about 0.2-1% wt.; phosphorus in an amount up to about 0.012% wt.; sulfur in an amount up to about 0.012% wt.; silicon in an amount up to about 0.5% wt., preferably from about 0.05–0.1% wt.; nickel in an amount of from about 1–5% wt., preferably from about 1.5–4% wt.; chromium in an amount of from about 0.25–3% wt., preferably from about 0.5–2% wt.; molybdenum in an amount of from about 0.1–1% wt., preferably from about 0.2–0.8% wt.; and vanadium in an amount up to about 2% wt., preferably from about 0.05–0.2% wt. The balance of the turbine disc substrate is iron, and the amount of iron is at least about 80% wt., more preferably at least about 90% wt. of the substrate. The turbine disc substrate generally has a 0.2% yield strength (ASTM-A370) of at least about 145 ksi, preferably 150 ksi and a tensile strength (ASTM-A370) of about 135–150 ksi. A commercially acceptable material is set forth as ASTM-A470, classes 5, 6 and 7.

Current filler metal compositions for depositing high-strength, tough weld metal for critical high performance applications are set forth in Table 1 as the AWS ER100S-2, 110S, and 120S classifications, with single digit values representing maximum allowable values. These compositions contain broad ranges for the individual alloying elements and the interdependence of the alloying elements with regard to the strength of the final weld deposit is not set forth.

TABLE 1

| AWS FILLER WELD WIRE COMPOSITIONS | | | |
|---|---|---|---|
| Alloying Element | ER120S | ER110S | ER110S-2 |
| Carbon | 0.1 | 0.09 | 0.12 |
| Manganese | 1.4–1.8 | 1.4–1.8 | 1.25–1.8 |
| Nickel | 2–2.8 | 1.9–2.6 | 0.8–1.25 |
| Chromium | 0.6 | 0.5 | 0.3 |
| Molybdenum | 0.3–0.65 | 0.25–0.55 | 0.2–0.55 |
| Vanadium | 0.03 | 0.04 | 0.05 |
| Silicon | 0.25–0.6 | 0.20–0.55 | 0.2–0.6 |
| Phosphorus | 0.01 | 0.01 | 0.01 |
| Sulfur | 0.01 | 0.01 | 0.01 |

The present invention provides a filler weld wire composition in which the individual alloying elements have been optimized to provide a weld deposit having a high 0.2% yield strength. The high yield strength has been achieved while retaining acceptable impact strength and FATT$_{50}$ characteristics of the final weld deposit. It has been surprisingly found that the optimization of the compositional limits for each alloying element is dependent upon the other alloying elements. Therefore, altering the quantity of one alloying element also requires the optimization of the other alloying elements. The preparation of the filler weld wire material of the present invention thus has required extensive optimization efforts of a multi-dependent variable system wherein each alloying element is a variable entity.

The filler wire of the present invention is an iron-based alloy composition containing at least about 85% wt., preferably at least about 90% wt., and more preferably at least about 94% wt. iron. The filler wire composition contains various alloying elements to improve the yield strength of the final weld material without compromising tensile strength. The alloying elements present in the filler wire composition include carbon, manganese, nickel, chromium, molybdenum, and vanadium.

Carbon is present in an amount of from greater than about 0.1 to about 0.12% wt., preferably from about 0.105–0.115, more preferably about 0.11% wt. Carbon adds strength to the welded composition, however when added in amounts above the stated range it may cause cracking in the weld and will reduce the toughness of the weld.

Manganese is present in an amount of from about 1.65–1.85% wt., preferably from about 1.7–1.8% wt., more preferably about 1.75% wt. Manganese also increases the strength and toughness, however in amounts above the stated range it may promote cracking and brittleness.

Nickel is present in an amount of from about 1.9–2.1% wt., preferably from about 1.95–2.05% wt., more preferably about 2.0% wt. Nickel does not improve the strength of the final composition as much as carbon and manganese, however it is useful in lowering the FATT$_{50}$ value of the weld and thus improve the weld toughness and resistance to crack initiation and propagation.

Chromium is present in an amount of from about 0.5–0.6% wt., preferably from about 0.54–0.56% wt., more preferably about 0.55% wt. Chromium has been found to increase the strength of the weld, however, in amounts above the stated range it may give rise to embrittlement problems; in amounts below the stated range the yield strength is decreased.

Molybdenum is present in an amount of from about 0.48–0.63% wt., preferably from about 0.53–0.58% wt., more preferably about 0.55% wt. Molybdenum has a strong influence on the strength of the weld, however when its concentration exceeds about 0.63% wt., toughness may be significantly degraded.

Vanadium is present in an amount of from about 0.008–0.02% wt., preferably from about 0.01–0.016% wt., more preferably about 0.014% wt. Vanadium has a strong influence on the strength of the weld, however it also degrades the toughness of the weld in concentrations above the stated range. The AWS ER 100, 110, and 120 series compositions set forth that the vanadium should be below about 0.05, however no preferred range is set, and in practice, it is usually avoided. It has now been found, however, that the presence of vanadium in the stated range is advantageous to increase the yield strength of the weld deposit.

The filler wire composition can also contain low levels of other alloying elements. Such alloying elements as phosphorus may be present in an amount up to about 0.008% wt.; sulfur in an amount up to about 0.005% wt., preferably in an amount of from about 0.002–0.005; and silicon in an amount up to about 0.4% wt., preferably from about 0.3–0.4% wt.

The filler wire preferably contains low levels of impurity elements that can adversely affect the performance of the weld by causing temper embrittlement during the postweld heat treatment, thus lowering the weld toughness to unacceptable levels. The filler wire composition preferably contains less than about 0.0015% wt. antimony, less than about 0.005% wt. tin, and less than about 0.005% wt. arsenic.

There is shown in FIG. 1 a gas turbine. The major components of the gas turbine are the inlet section 32, through which air enters the gas turbine; a compressor section 33, in which the entering air is compressed; a combustion section 34 in which the compressed air from the compressor section is heated by burning fuel in combustors 38; a turbine section 35, in which the hot compressed gas from the combustion section is expanded, thereby producing shaft power; and an exhaust section 37, through which the disposed rotor 36 extends through the gas turbine. Housed onto the rotor 36 are a plurality of discs 58, here shown in the turbine section 35, but also present in the compressor section 33. The rotor 36 and discs 58 are conventionally manufactured by using substrate Ni—Cr alloys and often develop cracks defined by walls 18 as shown in FIG. 2 which shows a cross-sectional view of a high performance alloy substrate 20, such as a turbine rotor or disc.

The filler wire composition can be welded onto the substrate alloy surface using a conventional gas tungsten arc welding procedure or a plasma arc welding procedure. The substrate alloy 20 is first heated to a temperature of from about 135° C. (275° F.)–190° C. (375° F.). Optionally, the crack walls 18 are machined to provide a better welding surface. As shown in FIG. 3, the weld filler wire 24 is then applied to the crack using a tungsten arc welding process. The welded area is then optionally allowed to cool to room temperature and non-destructive testing, such as magnetic particle inspection and ultrasonic testing can take place. At this time, the weld surface 26 can also be machined to conform to the surface of the alloy substrate 20.

The substrate is then subjected to a post-weld heat treatment to relieve stresses in the weld material, the heat affected zone, and adjacent base metal. The substrate is heated to a temperature of at least about 510° C. (950° F.), preferably to a temperature from about 535° C. (1000° F.)–620° C. (1150° F.), more preferably from about 535° C. (1000° F.)–565° C. (1050° F.). The substrate is maintained at this temperature for a time sufficient to achieve the desired yield strength for the welded area, preferably for at least about 10 hours, more preferably for about 5–20 hours.

Optimum strength characteristics can be achieved by adapting the welding procedure to the diameter of weld wire used for making the weld to produce a preferred bead size. For instance, Table 2 sets forth a preferred welding procedure for a particular filler wire diameter. The workpiece is preferably moved past the stationary welding arc at the stated speed. The welding of a single crack may require several welding passes.

TABLE 2

| Gas Tungsten Arc Weld Parameters | |
|---|---|
| Parameter | Filler Wire Diameter 1.14 mm (0.045 in.) |
| Amperes | 280 |
| Volts | 12–13.5 |
| Travel Speed (cm/min) | 13–18 |
| Wire Feed Rate (cm/min) | 127 ± 13 |
| Tungsten - 2% Thorium Electrode Dia. (cm) | 0.32 |

EXAMPLE 1

A filler weld composition is prepared having a composition of 0.10–0.12 weight percent carbon, 1.65–1.85 weight percent manganese, 1.90–2.10 weight percent nickel, 0.50–0.60 weight percent chromium, 0.48–0.63 weight percent molybdenum, 0.008–0.020 weight percent vanadium, balance iron. A weld deposit of the filler weld composition is made having dimensions of about 20 cm. long, 5 cm. wide and 5 cm. in depth. From this deposit a test specimen is cut having a 0.9 cm. diameter and 3.6 cm. deep. The 0.2% yield strength of the test specimen is determined in accordance with ASTM-A370.

Although the above description has been directed towards exemplary alloy substrates such as gas turbine rotors and discs, the principles disclosed herein are equally applicable to other alloy substrates, including steam turbine and generator rotors and discs. Moreover, it is understood that although the above description has been directed to a preferred embodiment of the invention, other modifications and variations known to those skilled in the art may be made without departing from the spirit and scope of the invention as set forth in the appended claims.

What is claimed is:

1. A filler wire composition comprising iron and alloying elements selected from the group consisting of carbon, manganese, nickel, chromium, molybdenum, vanadium, phosphorus, silicon, and sulfur, wherein said alloying elements are present in amounts of:
   (a) greater than about 0.10 to about 0.12 weight percent carbon;
   (b) from about 1.65–1.85 weight percent manganese;
   (c) from about 1.90–2.10 weight percent nickel;
   (d) from about 0.50–0.60 weight percent chromium;
   (e) from about 0.48–0.63 weight percent molybdenum; and
   (f) from about 0.008–0.020 weight percent vanadium, wherein the balance is essentially iron.

2. The filler wire composition of claim 1 wherein the carbon is present in an amount of about 0.105–0.115 weight percent.

3. The filler wire composition of claim 1 wherein the manganese is present in an amount of about 1.7–1.8 weight percent.

4. The filler wire composition of claim 1 wherein the nickel is present in an amount of about 1.95–2.05 weight percent.

5. The filler wire composition of claim 1 wherein the chromium is present in an amount of about 0.54–0.56 weight percent.

6. The filler wire composition of claim 1 wherein the molybdenum is present in an amount of about 0.53–0.58 weight percent.

7. The filler wire composition of claim 1 wherein the vanadium is present in an amount of about 0.010–0.016 weight percent.

8. The filler wire composition of claim 1 further comprising up to about 0.008 weight percent phosphorus, up to about 0.005 weight percent sulfur, and up to about 0.4 weight percent silicon.

9. The filler wire composition of claim 1 wherein the alloying elements are present in the following amounts: about 0.11 weight percent carbon; about 1.75 weight percent manganese; about 2.00 weight percent nickel; about 0.55 weight percent chromium; about 0.55 weight percent molybdenum; and about 0.014 weight percent vanadium.

10. A method of welding a turbine component, comprising:
   (a) welding a turbine component with a filler wire composition comprising iron and alloying elements selected from the group consisting of carbon, manganese, nickel, chromium, molybdenum, vanadium, phosphorus, silicon, and sulfur, wherein said alloying elements are present in an amount of:
   greater than about 0.10 to about 0.12 weight percent carbon;
   from about 1.65–1.85 weight percent manganese;
   from about 1.90–2.10 weight percent nickel;
   from about 0.50–0.60 weight percent chromium;

from about 0.48–0.63 weight percent molybdenum;
from about 0.008–0.020 weight percent vanadium,
wherein the balance is essentially iron; and (b) heat treating the weld,
wherein the weld comprising the filler wire has a 0.2% yield strength of at least 140 ksi after the heat treatment step.

11. The method of claim 10 wherein the weld comprising the filler wire has an impact strength of at least 25 ft-lb. at about 22° C. after the heat treatment step.

12. The method of claim 10 wherein the impurity levels in the weld after the heat treatment step are below about 0.0015 weight percent antimony, 0.005 weight percent tin, and about 0.005 weight percent arsenic.

13. The method of claim 10 wherein the filler wire composition further comprises up to about 0.008 weight percent phosphorus, up to about 0.005 weight percent sulfur, and up to about 0.4 weight percent silicon.

14. A turbine containing a repair welded turbine component comprising:

(a) a turbine component substrate; and
(b) a weld on the turbine component substrate comprising a deposited filler wire weld material comprising iron and alloying elements selected from the group consisting of carbon, manganese, nickel, chromium, molybdenum, vanadium, phosphorus, silicon, and sulfur, wherein said alloying elements are present in an amount of:

greater than about 0.10 to about 0.12 weight percent carbon;
from about 1.65–1.85 weight percent manganese;
from about 1.90–2.10 weight percent nickel;
from about 0.50–0.60 weight percent chromium;
from about 0.48–0.63 weight percent molybdenum; and
from about 0.008–0.020 weight percent vanadium,
wherein the balance is essentially iron; and
wherein the weld has a 0.2% yield strength of at least 140 ksi.

15. The turbine of claim 14 wherein the turbine component is a disc or a rotor.

16. The turbine of claim 14 wherein the weld has an impact strength of at least 25 ft-lb. at about 22° C.

17. The turbine of claim 16 wherein the weld has a 0.2% yield strength of at least about 145 ksi.

18. The turbine of claim 17 wherein the disc substrate is an iron-based alloy comprising carbon in an amount up to about 0.5% wt., manganese in an amount of from about 0.2–1% wt., phosphorus in an amount up to about 0.012% wt., sulfur in an amount up to about 0.012% wt., silicon in an amount up to about 0.5% wt., nickel in an amount of from about 1–5% wt., chromium in an amount of from about 0.25–3% wt., and molybdenum in an amount of from about 0.1–1% wt.

19. The turbine of claim 17 wherein the impurity levels in the weld after the heat treatment step are below about 0.0015 weight percent antimony, 0.005 weight percent tin, and about 0.005 weight percent arsenic.

20. The turbine of claim 17 wherein the filler wire composition further comprises up to about 0.008 weight percent phosphorus, up to about 0.005 weight percent sulfur, and up to about 0.4 weight percent silicon.

* * * * *